US012752898B1

(12) United States Patent
Heap et al.

(10) Patent No.: US 12,752,898 B1
(45) Date of Patent: Oct. 6, 2026

(54) POWER SYSTEMS AND METHODS FOR CONTROLLING POWER FOR MARINE VESSELS

(71) Applicant: Brunswick Corporation, Mettawa, IL (US)

(72) Inventors: David M. Heap, Fond du Lac, WI (US); Brad E. Taylor, Stillwater, OK (US); Matthew Z. Seta, Fond du Lac, WI (US)

(73) Assignee: Brunswick Corporation, Mettawa, IL (US)

( * ) Notice: Subject to any disclaimer, the term of this patent is extended or adjusted under 35 U.S.C. 154(b) by 337 days.

(21) Appl. No.: 18/423,058

(22) Filed: Jan. 25, 2024

(51) Int. Cl.
*B63H 21/17* (2006.01)
*B60L 3/00* (2019.01)
*B60L 53/16* (2019.01)
*B63H 20/00* (2006.01)

(52) U.S. Cl.
CPC .............. *B63H 21/17* (2013.01); *B60L 53/16* (2019.02); *B60L 3/0092* (2013.01); *B60L 2200/32* (2013.01); *B63H 2020/003* (2013.01)

(58) Field of Classification Search
CPC ... B63H 21/17; B63H 2020/003; B60L 53/16; B60L 3/0092; B60L 2200/32
See application file for complete search history.

(56) References Cited

U.S. PATENT DOCUMENTS

| | | | | |
|---|---|---|---|---|
| 6,855,016 | B1 * | 2/2005 | Jansen | B63H 21/17 440/27 |
| 7,150,664 | B1 | 12/2006 | Uppgard et al. | |
| 7,255,616 | B1 | 8/2007 | Caldwell | |
| 7,408,273 | B2 * | 8/2008 | Slocum | B63J 3/04 307/80 |
| 7,467,595 | B1 | 12/2008 | Lanyi et al. | |
| 7,994,795 | B2 | 8/2011 | Drake et al. | |
| 9,362,838 | B1 | 6/2016 | Balogh et al. | |
| 11,146,029 | B1 | 10/2021 | Shaffer et al. | |
| 2016/0301176 | A1 * | 10/2016 | Mathews | B60L 53/16 |
| 2020/0216018 | A1 * | 7/2020 | Takano | B63H 21/21 |
| 2022/0200070 | A1 * | 6/2022 | Gonring | H01M 50/579 |
| 2023/0053671 | A1 * | 2/2023 | Gonring | B63H 21/17 |
| 2024/0178644 | A1 * | 5/2024 | Hwang | H01R 25/003 |

FOREIGN PATENT DOCUMENTS

| | | | | |
|---|---|---|---|---|
| DE | 202023107083 | U1 * | 3/2025 | H02G 3/0493 |

* cited by examiner

*Primary Examiner* — Harry Y Oh
(74) *Attorney, Agent, or Firm* — Andrus Intellectual Property Law, LLP

(57) ABSTRACT

A power system for a marine vessel. A battery is configured to store energy for the marine vessel. A charger is operable to charge the battery. A battery switch is operatively coupled to the battery, the battery switch being switchable between an on-state in which the battery is configured to provide the energy to the marine vessel and an off-state in which the battery is prevented from providing the energy to the marine vessel. The power system further includes an external power connection through which power is receivable for operating the charger to charge the battery. The external power connection is positioned adjacent to the battery switch such that each is accessible at the same time.

20 Claims, 9 Drawing Sheets

POWER SYSTEMS AND METHODS FOR CONTROLLING POWER FOR MARINE VESSELS

FIELD

The present disclosure generally relates to power systems and methods for controlling power for marine vessels.

BACKGROUND

The following provide background information and are incorporated by reference in entirety.

U.S. Pat. No. 11,146,029 discloses a plug holder for installing a male plug end of a marine battery charger on a marine vessel includes an outer housing, a removable sleeve, and a backstop. The outer housing has a front end defining a plug opening and a back end defining a back opening, wherein the outer housing is attachable to a vessel hull and configured to hold a male plug end of the marine battery charger within the outer housing such that it is accessible through the plug opening.

U.S. Pat. No. 9,362,838 discloses an electrical power system connectable to an AC base power supply to provide AC base electrical power to a mobile unit. The AC mobile unit electrical power is provided in one embodiment without pass-through of AC electrical power which would otherwise bypass an AC/DC inverter. In one implementation, a marine electrical power system is connectable to an AC shore power supply to provide AC shore electrical power to a docked marine vessel.

U.S. Pat. No. 7,994,795 discloses a current detector and indicator unit that are coupled to a shore power cord for monitoring for corrosion-causing galvanic current on the ground wire of the power cord. A current transducer coupled to the ground wire senses current and provides a signal corresponding to the magnitude of the sensed current to a microcontroller.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

One aspect of the present disclosure generally relates to a power system for a marine vessel. A battery is configured to store energy for the marine vessel. A charger is operable to charge the battery. A battery switch is operatively coupled to the battery, the battery switch being switchable between an on-state in which the battery is configured to provide the energy to the marine vessel and an off-state in which the battery is prevented from providing the energy to the marine vessel. The power system further includes an external power connection through which power is receivable for operating the charger to charge the battery. The external power connection is positioned adjacent to the battery switch such that each is accessible at the same time.

In certain examples, the battery switch and the external power connection are each coupled to a panel so as to be coupled to the marine vessel together.

In certain examples, a cover is moveable between a first position that prevents connecting to the external power connection to provide power to the charger and a second position in which the external power connection is accessible for connecting thereto. The cover may be slidable between the first position and the second position. In certain examples, when the cover is in the first position the battery switch is switchable to the off-state to prevent the battery from providing the energy to the marine vessel, whereby when the cover is in the second position the battery switch is prevented from being switched to the off-state.

In certain examples, the battery switch is configured such that the battery switch can be locked in the off-state by a lock separatable from the battery switch. In certain examples, the battery switch is coupled to the marine vessel via a housing, and wherein at least one of the battery switch and the housing is configured to receive a shackle of the lock to lock the battery switch in the off-state.

In certain examples, the battery switch comprises a handle and is configured such that pulling the handle outwardly disconnects the battery from providing the energy to the marine vessel. A cover may be moveable between a first position in which the handle may be pulled outwardly to disconnect the battery and a second position in which the handle is prevented from being pulled outwardly to disconnect the battery.

In certain examples, a light indicates whether the battery is operable to provide the energy to the marine vessel. The light may be positioned adjacent to the battery switch, where the light is on when the battery is operable to provide the energy to the marine vessel, and where the light turns off when the battery switch is operated to disconnect the battery from providing the battery to the marine vessel to thereby provide notification of the disconnecting.

In certain examples, a first cover is moveable between a first position that prevents connecting to the external power connection to provide power to the charger and a second position in which the external power connection is accessible for connecting thereto. A second cover separate from the first cover may be moveable between a first position in which the external power connection is accessible and a second position in which the external power connection is blocked so as to shield the external power connection from weather. The first cover may be configured such that when the first cover is in the first position the second cover is prevented from being in the first position.

In certain examples, the external power connection is prevented from connecting thereto when the battery switch is in the off-state.

In certain examples, the battery switch and the external power connection are configured such that when a connection is made to the external power connection the battery switch cannot be in the off-state.

In certain examples, a control system is operatively coupled to the battery switch and the charger, where the control system is configured to disable the charger to thereby prevent the battery from charging when the battery switch is in the off-state.

In certain examples, a control system is operatively coupled to the battery switch and the charger, where the control system is configured to prevent power from being received through the external power connection when the battery switch is in the off-state.

In certain examples, the external power connection is configured to receive AC power from outside the marine vessel, and the battery switch and the external power connection are parts of the marine vessel.

Another aspect of the present disclosure generally relates to a method for configuring a marine vessel for controlling power therein, where the marine vessel has a battery configured to store energy for the marine vessel and a charger configured to receive power from an external power source for charging the battery. The method includes electrically coupling a battery switch to the battery, the battery switch being switchable between an on-state in which the battery is configured to provide the energy to the marine vessel and an off-state in which the battery is prevented from providing the energy to the marine vessel. The method further includes electrically coupling an external power connection through which power is receivable from an external power source for operating the charger to charge the battery. The method further includes coupling the battery switch and the external power connection to the marine vessel such that connecting to the external power connection is prevented when the battery switch is in the off-state.

Another aspect according to the present disclosure generally relates to a power system for a marine vessel. A battery is configured to store energy for the marine vessel and a charger operable to charge the battery. A battery switch is operatively coupled to the battery, where the battery switch is switchable between an on-state in which the battery is configured to provide the energy to the marine vessel and an off-state in which the battery is prevented from providing the energy to the marine vessel. The power system further includes an external power connection through which power is receivable for operating the charger to charge the battery. A cover is moveable between a first position that prevents connecting to the external power connection and a second position in which the external power connection is accessible for connecting thereto, where the battery switch is switchable to the off-state only when the cover is in the first position.

It should be recognized that the different aspects described throughout this disclosure may be combined in different manners, including those than expressly disclosed in the provided examples, while still constituting an invention accord to the present disclosure.

Various other features, objects and advantages of the disclosure will be made apparent from the following description taken together with the drawings.

BRIEF DESCRIPTION OF THE DRAWINGS

The present disclosure is described with reference to the following Figures.

DETAILED DISCLOSURE

Figure 1:
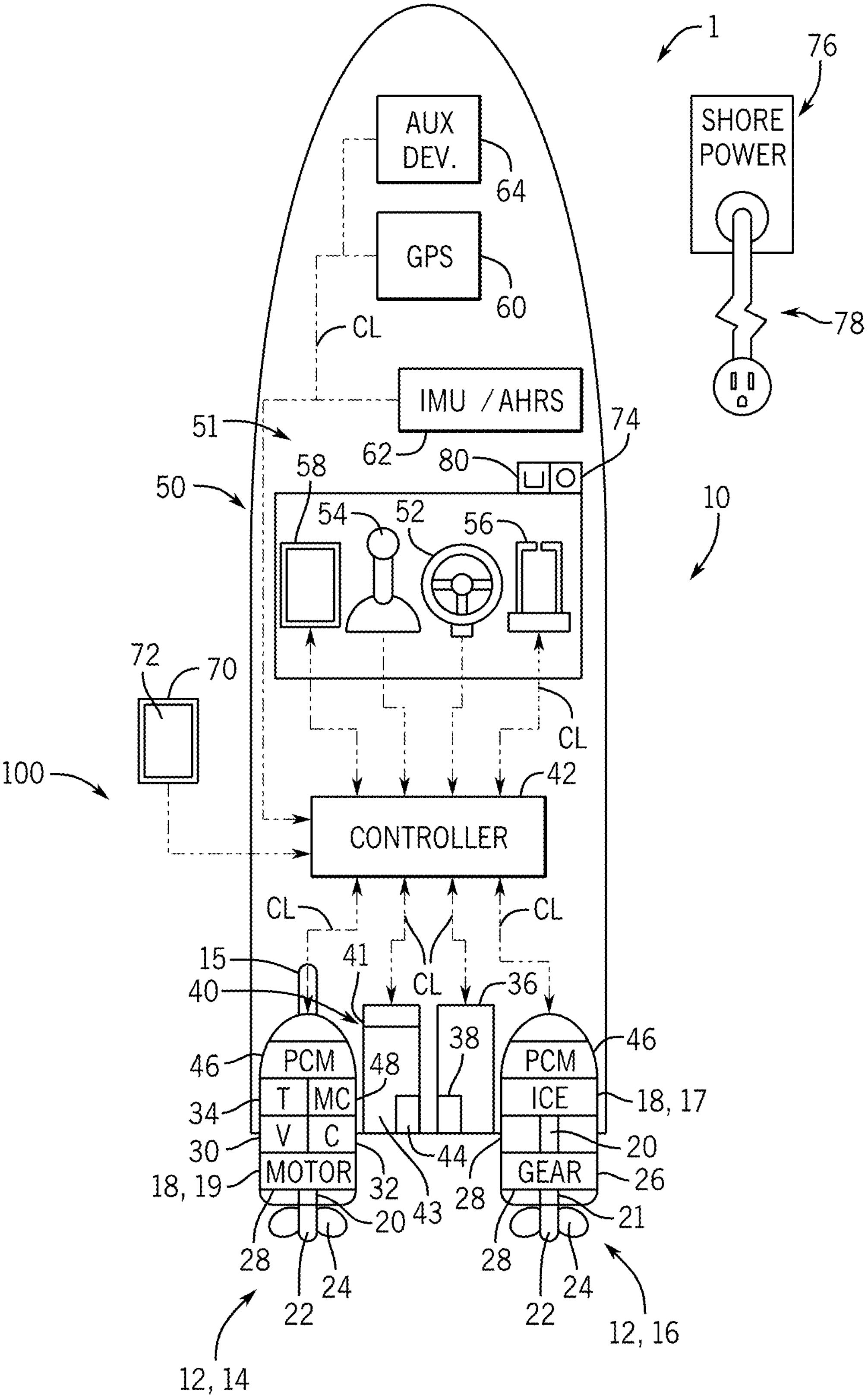
FIG. 1 is a top view of a marine vessel incorporating one embodiment of a power system according to the present disclosure.

In the present description, certain terms have been used for brevity, clarity, and understanding. No unnecessary limitations are to be implied therefrom beyond the requirement of the prior art because such terms are used for descriptive purposes only and are intended to be broadly construed. The different systems and methods described herein may be used alone or in combination with other systems and methods. Various equivalents, alternatives, and modifications are possible.

The present inventors have recognized that there are unique challenges to managing power for a marine vessel, some of which have not previously been identified and addressed. Marine vessels commonly have one or more energy storage devices for providing electrical power for the marine vessel, for example a battery bank of rechargeable batteries, fuel cells, capacitors, and/or the like. For the sake of brevity, the present disclosure principally refers to batteries as the energy storage devices. This electrical power may be used for powering a wide variety of devices both when the marine vessel is underway or is docked, such as for communication radios, GPS, display devices, bilges, lighting, refrigerators, HVAC systems, and the like (also referred to as the "house load"). As marine vessels advance over time, including the integration of electric powered marine drives, the energy storage capacity has also increased to meet these additional power demands. This capacity includes higher voltages and/or amounts of stored energy (e.g., amp-hours).

The power systems of some marine vessels include an external power connection through which power may be received from an external power source, such as a shore power station at a marina. The external power connection may be a conventional connector configured to electrically connect with a power-carrying cable having a corresponding plug, whereby the cable is electrically connected at the other end to the external power source. It should be recognized that the terms "connector" and "plug" may be used interchangeably unless otherwise noted. By way of example, the external power connector may be a male or female straight blade configuration rated at 10A or 12A and 120V as is prevalent in the United States, locking connectors of varying amperages (e.g., 20A, 30A, 50A and 120V or 250V), or other types of known power connectors. The external power connection is positioned in a location that is convenient from outside the marine vessel. For example, the external power connection may be positioned at or near the bow, at or near the stern (e.g., at the transom), or on a side of the hull (e.g., on the gunwale) so as to be easily plugged into while standing on a dock.

The power from the external power source may be supplied to house loads that are hardwired or themselves plugged into connectors or receptacles on the marine vessel. The power from the external power source may be converted between AC and DC power, stepped up or down to different voltages, filtered, or otherwise conditioned in a conventional manner. By way of example, the external power source may be electrically coupled to outlets within the marine vessel that supply power at 120 VAC, to 12 VDC accessory outlets, and/or to USB ports operating at 5 VDC. These outlets and ports may also be powered by the batteries onboard the marine vessel, particularly when disconnected from the external power source. Power from the external power source can also be used to power hardwired components such as one or more chargers that operate to charge the batteries on the marine vessel.

Some marine vessels also include a mechanism for turning off the batteries such that the batteries no longer provide energy to the power system of the marine vessel. These may be local switches positioned on or with each battery, one or more switches in different compartments in which one or more batteries are stored, and/or one or more switches positioned near the helm. The batteries may be switched off to service the power system or the marine vessel more generally, or other occasions in which it is beneficial to not have the batteries provide power to the power system. The battery switch is referred to as being in the on-state when the battery is configured to provide energy to the marine vessel, switchable to an off-state in which the battery effectively disconnected to be prevented from providing the energy to the marine vessel. Each battery may be outfitted with its own separate battery switch and thus independently controlled.

The present inventors have identified that one such occasion in which it is beneficial to disable the batteries is when a first responder boards a marine vessel in the event of an emergency. Locating the various battery switches can be troublesome enough, but the present inventors have identified a further problem in that the batteries are not the only source of power for the power system. As discussed above, power is also receivable from an external power source. Therefore, even if the batteries are successfully disconnected via one or more battery switches, the power system may still be live via a connection to the external power source. Moreover, the existence of a battery switch (and the knowledge of having turned it off) may lead to the false belief that the entire power system is de-energized, whereas a battery charger or other devices receiving power from the external power source are uncontrolled by the battery switch and thus remain powered.

While it is possible for the operator, a first responder, or the like (also referred to generally as users) to also unplug the external power connection in addition to turning off all battery switches, there is no known mechanism for informing these users of the statuses of these two sources of power, nor to remind, guide, or assist the users in ensuring that all sources have been disabled. Additionally, the present inventors have recognized that battery switches known in the art are not positioned in close proximity to the external power connection and thus there is no visual cue to the person that both sources require disabling. Moreover, since the external power connection is not adjacent to the battery switch, the two are not accessible to the user at the same time. This may be particularly problematic for first responders, who are not familiar with the particular marine vessel or the specific protocols for disabling all its sources of power.

Accordingly, the present inventor has developed the presently disclosed systems and methods for simplifying and in certain cases automating processes for disabling power within a marine vessel's power system, and/or indicating the status of the power systems or components thereof.

FIG. 1 depicts an example of a power system 10 for a marine vessel 1 according to the present disclosure. As discussed further below, the power system 10 may include batteries or other power storage devices, control devices, charging devices, indication devices (lights, speakers), various connections, inverters, conditioning devices (e.g., filters), and the like. In general, these components within the power system 10 provide for receiving, controlling, storing, detecting and/or supplying power, as well as determining and communicating power related statuses for the marine vessel.

The marine vessel is configured to move within a body of water in a direction instructed by an operator via a steering control system, or by a guidance system configured to automatically control steering of the marine vessel to steer the vessel toward a predetermined location or global position. The marine vessel 1 may be steered in a conventional manner, such as by controlling a marine drive or a rudder via a steering actuator. Additional information regarding exemplary steering actuators is provided in U.S. Pat. Nos. 7,150,664; 7,255,616; and 7,467,595, which are incorporated by reference herein.

The marine vessel 1 of FIG. 1 has a propulsion system with at least one marine drive 12 configured to propel the marine vessel 1 through the water. While the propulsion system is generally described herein as using motors or engines as powerheads to generate thrust in the water, the present disclosure is also applicable for marine vessels that are moved in the water via sails, oars, pedals, and/or other mechanisms. For demonstration purposes, the present marine vessel 1 is shown to have two different marine devices 12, specifically an electric marine drive 14 steerable by a tiller handle 15 with a throttle grip, and a gasoline powered marine drive 16 (e.g., steerable by conventional steering actuators). While the marine drives 12 are shown as outboard motors, these could instead be inboard motors, stern drives, pod drives, and/or jet drives. Each marine drive 12 includes a powerhead 18. The powerheads 18 may be internal combustion engines (ICE) 17 (e.g., gasoline or diesel engines, gasoline for the gasoline powered marine drive 16), electric motors 19 (e.g., for the electric marine drive 14), and/or a hybrid thereof. Examples of powerheads 18 for electric marine drives include, for example, a brushless DC motor, a DC brushed motor, an AC brushless motor, a direct drive, a permanent magnet synchronous motor, an induction motor, or any other device that converts electric power to rotational motion. In certain embodiments, the powerheads 18 include a rotor and a stator in a known configuration.

Each powerhead 18 has a drive shaft 20 that rotates during operation. Each drive shaft 20 is connected in a torque-transmitting relationship with a propeller shaft 22 that rotates a propeller 24 connected thereto. In this manner, each powerhead 18 rotates a corresponding propeller 24 to generate thrust in the water. As will be known to one of ordinary skill in the art, the propeller 24 may include one or more propellers, impellers, or other propulsor devices and that the term "propeller" may be used to refer to all such devices.

In certain configurations, the drive shaft 20 of the powerhead 18 is connected to the propeller shaft 22 via a gear system 26 or transmission. In this case the gear system 26 or transmission receives rotation from the drive shaft 20 as an input and selectively rotates an output shaft 21 as an output. In particular, the gear system 26 is operable to adjust conversion of the rotation and/or to disconnect the propeller shaft 22 from the drive shaft 20 therethrough, as is sometimes referred to in the art as a "neutral" position in which rotation of the drive shaft 20 is not translated to the propeller shaft 22. The gear system 26 may also shift between "forward" and "reverse" positions, which changes the direction in which the propeller shaft 22 is caused to rotate by rotation of the drive shaft 20. Various gear systems 26, or transmissions, are well-known in the relevant art. In other examples, the powerhead may directly connect to the propeller shaft 22 such that rotation of the drive shaft 20 is directly transmitted to the propeller shaft 22 at a constant and fixed ratio (e.g., for an electric marine drive 14). Shifting a marine drive 12 from neutral to either forward or reverse, or to begin generating propulsion generally, may also be referred to as "engaging" the marine drive 12. Likewise, disengaging the marine drive 12 corresponds to causing the marine drive 12 to no longer generate propulsion, such as by stopping rotation of the powerhead 18 and/or transitioning into a neutral position.

With continued reference to FIG. 1, the marine drives 12 further include powerhead sensors measuring various aspects of the powerheads 18, including a speed in which a powerhead 18 is operating. In certain examples, the powerhead sensors are speed sensors 28 that measure a rotational speed of the drive shaft 20, the output shaft 21, and/or the propeller shaft 22. The shaft rotation sensor 28 may be a Hall-Effect sensor or another rotation sensor that measures the rotational speed in rotations per minute (RPM) in a manner known in the art (e.g., using capacitive or inductive measuring techniques).

Other examples of powerhead sensors, particularly in the case of an electric marine drive 14, include a voltage sensor 30, a current sensor 32, and/or a torque sensor 34 configured to sense an input voltage to the electric motor 19, an input current to the electric motor 19, and a torque output of the electric motor 19, respectively. Accordingly, power delivered to the electric motor 19 can be calculated based on the measurements of the voltage sensor 30 and the current sensor 32. In certain examples, one or more of the parameters, such as the speed, torque, or power to the electric motor 19, may be calculated based on other measured parameters or characteristics of the various sensors. For example, the torque may be calculated based on power characteristics in relation to the rotation speed of the electric motor. These measurements and calculations can then be used for monitoring and controlling the marine vessel 1, including the power system 10 and/or the powerheads 18.

The marine drives 12 are connected so as to receive energy from one or more energy sources. In the case of a gasoline powered marine drive 16, the energy is gasoline and the energy source is a fuel tank 36 fluidly connected to the ICE 17 in a conventional manner. A fuel level sensor 38 is configured to measure the amount of fuel remaining in the fuel tank 36 in a conventional manner (e.g., a Hall effect sensor that measures a position of a float within the fuel tank 36).

In the case of an electric marine drive 14, the energy is electrical power, and the energy source is a power storage system 40. The power storage system 40 stores electrical energy for powering the electric motor 19 and is rechargeable via a charger 41 that receives power from an external power connection. In certain examples, the charger may provide hundreds or even thousands of watts depending on the storage capacity of the power storage system. While the present disclosure generally refers to the external power connection as being a conventional source of shore power, this could also or alternatively be solar panels, wind vanes, water wheels, and/or other sources of power. Various power storage devices and systems are known in the relevant art. The power storage system 40 may be a battery system including one or more batteries or banks of batteries. For example, the power storage system 40 may include one or more lithium-ion (LI) battery systems, each LI battery comprised of multiple battery cells 43. In other embodiments, the power storage system 40 may include one or more lead-acid batteries, fuel cells, flow batteries, ultracapacitors, and/or other devices capable of storing and outputting electric energy. By way of example, this may include marine batteries in the group sizes BCI 24, 27, 31, and/or 34.

The amount of energy available within the energy source for operating the marine drives 12 may also be referred to as the "remaining energy". By way of example, this may be measured in kilowatt-hours, amp-hours, or other electrical measures in the case of electrical energy stored in energy sources, and/or as a volume such as liters or gallons in the case of energy stored in fuel tanks 36. It should be recognized that these measures may also be represented in other forms or units, such as a portion of maximum capacity (e.g., state of charge such as 55% charge remaining, 40% of fuel remaining), in terms of time or "time to empty" at a given energy consumption (e.g., 15 minutes remaining), distance or "distance to empty" at a given energy consumption (e.g., 2.5 miles remaining) or other measures relating to the amount of energy that remains within the energy source for use by the marine drives 12. Techniques for determining the remaining energy of electrical and fuel-based energy sources are well-known in the art and thus not described further here.

With continued reference to FIG. 1, the marine vessel 1 includes a control system 100 that controls the power system 10 and other systems and devices of the marine vessel. The control system 100 may include a plurality of control devices configured to cooperate to provide the method of controlling the marine propulsion system described herein. For example, the control system 100 includes a central controller 42, a battery controller (BC) 44, a propulsion control module (PCM) 46, and one or more motor controllers 48, trim controllers, steering controllers, etc. Other controllers are also contemplated, such as a charging controller within the charger 41. The different controllers 44, 46, 48, 42 and may be communicatively connected via communication links CL, which may be as a communication bus such as a CAN bus or a LIN bus, or by single dedicated communication links between components. A person of ordinary skill in the art will understand in view of the present disclosure that other control arrangements could be implemented and are within the scope of the present disclosure, and that the control functions described herein may be combined into a single controller or divided into any number of a plurality of distributed controllers that are communicatively connected. In certain embodiments, the controller 42, battery controller 44, and PCM 46 are contained entirely within the marine drive itself (e.g., an electric marine drive).

Each controller may comprise a processor and a storage device, or memory, configured to store software and/or data utilized for controlling and or tracking operation of the electric propulsion system 2. The memory may include volatile and/or non-volatile systems and may include removable and/or non-removable media implemented in any method or technology for storage of information. The storage media may include non-transitory and/or transitory storage media, including random access memory, read only memory, or any other medium which can be used to store information and be accessed by an instruction execution system, for example. An input/output (I/O) system provides communication between the control system 100 and peripheral devices.

In certain embodiments, various sensing devices 28, 30, 32, 34, 38, and/or 44 may be configured to communicate with a local controller, such as the motor controller 48, a propulsion control module PCM 46, or battery controller 44. In other embodiments, the various sensing devices 28, 30, 32, 34, and/or 38 may communicate with the central controller 42, which may permit eliminating one or more local controllers. In the example of FIG. 1, the voltage sensor 30 and the current sensor 32 may be communicatively connected to the motor controller 48 to provide measurement of the voltage supplied to the motor and current supplied to the electric motor 19. The motor controller 48 is configured to provide appropriate current and or voltage to meet the demand request for controlling the electric motor 19. For example, a demand input may be received at the motor controller 48 from the central controller 42 (shown here via a propulsion control module 46) such as based on an operator demand at a helm input device. The motor controller 48, voltage sensor 30, and current sensor 32 may be integrated into a housing of the electric motor 19. In other embodiments, the motor controller 48 may be separately housed, as well as the propulsion control module 46.

Each electric motor 19 may be associated with its own motor controller 48 configured to control power to the electric motor, such as to the stator winding thereof. The motor controller 48 is configured to control the function and output of the electric motor 19, such as controlling the torque outputted by the motor, the rotational speed of the electric motor 19, as well as the input current, voltage, and power supplied to and utilized by the electric motor 19. In one arrangement, the motor controller 48 controls the current delivered to the stator windings via leads connected to the electric motor 19, which input electrical energy to the electric motor to induce and control rotation of the rotor.

As stated above, the power system 10 of FIG. 1 further includes a battery controller 44 configured to monitor and/or control aspects of the power storage system 40. The battery controller 44 may further be configured to receive information from current, voltage, and/or other sensors within the power storage system 40, such as to receive information about the voltage, current, and temperature of each battery cell or group of battery cells 43 within the power storage system 40. For example, the battery controller 44 may receive inputs from one or more sensors within the power storage system 40, such as one or more voltage, current, and temperature sensors within a housing for the power storage system 40. As described above, voltage sensors 30 may be configured to sense voltage within the battery (such as cell voltage sensors configured to sense the voltage of individual cells or groups of cells in a LI battery) and one or more temperature sensors may be configured to sense a temperature within a housing of the power storage system 40 where one or more batteries or other storage elements are located. The battery controller 44 or other controller in the system is configured to calculate a charge level, such as a state of charge, of the power storage system 40.

With continued reference to FIG. 1, additional components are also provided in communication with the control system 100, each of which may function as an input thereto and/or output thereof. In the example shown, the controller 42 also receives input from and/or communicates with one or more user interface devices within a user interface system 50 via the communication links CL, which in some embodiments may be the same communication link as utilized for communication between the controllers 44, 46, 48, or may be a separate communication link. The user interface devices 50 in the exemplary embodiment include a steering wheel 52, a joystick 54, throttle levers 56, and a display device 58.

The steering wheel 52 and joystick 54 may be configured to receive user inputs in a conventional manner, which subsequently may communicate with the controller 42 to effectuate steering control over the marine vessel 1, such as by steering one or more marine drives 12, which is well-known and typically referred to as steer-by-wire arrangements. Other steer arrangements, such as steering cable systems arrangements, are well-known in the art and could alternatively be implemented.

Likewise, the throttle levers 56 may be configured to receive user inputs in a conventional manner (also referred to as receiving a requested speed or a demand request), including both a magnitude and a direction for generating thrust, which may be subsequently communicated with the controller 42. In particular, the throttle levers 56 may communicate with the controller 42 to effectuate control of the output of the powerheads 18 of the one or more marine drives 12, which is well-known and typically referred to as a throttle-by-wire arrangement. By way of example, rotating one of the throttle levers 56 in a forward direction away from its neutral, detent position could be interpreted as a value from 0% to 100% demand request that corresponds, via an input/output map such as a look up table, to control the output of the powerhead 18 for the corresponding marine drive 12. In the case of a gasoline powered marine drive 16, rotating the throttle lever 56 may effectuate control a throttle valve position (and in certain examples, the transmission being shifted for rotating the propeller in the forward direction). This may occur through communication between the central controller 42 and a propulsion control module 46. In the case of an electric marine drive 14, rotating the throttle lever 56 may effectuate control of how much power is provided to the electric motor 19 rotating in the forward direction. This may occur through communication with a motor controller 48 and/or propulsion control module 46.

The input/output map may provide that no power is provided to the electric motor 19, or that the throttle valves are closed to an idle position, when the throttle lever 56 is in the neutral, detent position (i.e., 0% demand request). Likewise, maximum power may be provided to the electric motor 19, or the throttle valves being fully open, when the throttle lever 56 is pushed forward to its furthest extent (i.e., 100% demand request). It should be recognized that the throttle lever 56 being pushed backwards to its furthest extent (e.g., −100% demand request) responds oppositely, generating a corresponding thrust in an opposite direction (which may involve shifting the transmission in a conventional manner).

The present disclosure also contemplates alternate configurations, such as marine drives having tiller handles for controlling steering and throttle (and in either electric, fuel-based, or hybrid configurations). Likewise, demand requests may be received other than from throttle levers or grips, for example from cruise control or auto-pilot operational modes known in the art.

The display device 58 is configured to display information for the user, as well as to receive input commands relating to steering, thrust, and/or other functions of the marine vessel and/or marine drive. This includes the programming of destinations and waypoints for autopiloting. In particular, the display device 58 may be a multi-functional display device permitting touchscreen inputs from the user. It should be recognized that other input devices may also be provided, such as keyboards, trackpads, roller balls, and the like. In various embodiments, the display device 58 may be, for example, part of an onboard management system, such as the VesselView™ by Mercury Marine of Fond du Lac, Wisconsin.

The onboard management system may also or alternatively be controlled through an external device 70 that wirelessly communicates with the controller 42, such as a tablet or smartphone communicating via wireless protocols known in the art (e.g., Wi-Fi or Bluetooth®). The external device 70 may have a processor, storage device, and an input/output (I/O) system in the same manner as other controllers discussed above. The processor may be configured to execute an application stored in the storage device that enables the user to receive information from the controller 42 relating to the marine drives 12 and the marine vessel 1 more generally, to input a destination for propelling the marine vessel, and to provide input commands to the controller 42 for controlling the marine drives 12 and the marine vessel 1 more generally. By way of example, the external device 70 may be configured to operate an application such as the "Mercury Marine" App or the VesselView™ Mobile App each provided by Mercury Marine of Fond du Lac, Wisconsin. In each case, the applications allow the user to receive information and to provide input commands via a user interface 72 of the external device 70, such as via a touchscreen. In this manner, the external device 70 may also constitute a controller within the control system 100.

Other components may also communicate with the controller 42, such as a GPS system 60 configured to determine a current global position of the vessel, track vessel position over time, and/or determine vessel speed and direction of travel and to provide this information to the controller 42. Alternatively, or additionally, vessel speed may be measured by a speed-over-water sensor such as a pitot tube or a paddle wheel and such information may be provided to the controller 42. This communication may again be provided via CAN bus, LIN bus, or single dedicated communication links).

The marine vessel 1 may also include an inertial measurement unit (IMU) or an attitude and heading reference system (AHRS) (collectively shown as the IMU/AHRS 62). An IMU has a solid state, rate gyro electronic compass that indicates the vessel heading and solid-state accelerometers and angular rate sensors that sense the vessel's attitude and rate of turn. An AHRS provides 3D orientation of the marine vessel 1 by integrating gyroscopic measurements, accelerometer data, and magnetometer data. The IMU/AHRS 62 could be GPS-enabled, in which case a separate GPS system 60 would not be required. The IMU/AHRS 62 may communicate with the controller 42 in a similar manner to the GPS system 60.

In addition to the electric marine drive 14, the GPS 60, the IMU/AHRS 62, and other electrical devices are also powered by the power system 10. In particular, the power system 10 may further be configured to power auxiliary devices 64 on the marine vessel 1 such as a bilge pump, a cabin light, a stereo system or other entertainment devices on the vessel, a water heater, a refrigerator, an air conditioner or other climate/comfort control devices on the vessel, communication systems, navigation systems, or the like. These devices may be powered from batteries (which are in turn powered by a charger), or directly powered by an external power source.

With continued reference to FIG. 1, the marine vessel 1 has an external power connection 74 that is electrically coupled to the power system 10, including to the charger 41 for charging the cells 43 within the power storage system 40. The external power connection 74 may vary in form but is generally configured for being electrically coupled to an external power source such as a shore power station 76, for example via a cable 78 having conventional flat blade electrical prongs. By way of example, the external power connection 74 may be a NMEA L5-30—Standard 30A shore power receptacle. FIG. 1 shows in embodiment in which the external power connection 74 is positioned at or near the helm 51. However, as will become apparent, the external power connection 74 may be positioned elsewhere, such as on the exterior surface of the gunwale near the bow, stern, or somewhere therebetween. The cable 78 or other power carrying mechanisms may be electrically mated to the external power connection 74 in a manner known in the art.

The marine vessel 1 also includes a battery switch 80, which is also at or near the helm 51, but more importantly is near the external power connection 74. The battery switch 80 may vary in form, including rocker switches, toggle switches, slide switches, soft switches, rotating switches, and/or other switches known in the art. The battery switch 80 is electrically coupled to the batteries or the power storage system 40 more generally and switchable between an on-state in which the power storage system 40 is configured to provide the energy to the marine vessel 1, and an off-state in which the power storage system 40 is prevented from providing the energy to the marine vessel 1. The marine vessel 1 may advantageously positions the battery switch 80 in a position convenient to the operator and also an intuitive location for checking, such as for first responders not familiar with the marine vessel 1. As discussed above, this may be near the bow or stern, or at the helm, by way of example. The power system 10 is further advantageous in that there is a single battery switch 80 that is electrically connected to effectuate control for more than one battery, simplifying the process of disconnecting power for all batteries despite the batteries being located in disparate parts of the marine vessel 1 and/or being in difficult areas to access.

In view of the discussion above, the configuration also advantageously locates the external power connection 74 adjacent to or otherwise in close proximity to the battery switch 80 such that each are accessible at the same time. In other words, a person can see and operate both the external power connection 74 (e.g., to plug in or unplug a cable) and the battery switch 80 at the same time, without moving elsewhere within the marine vessel 1. However, the external power connection 74 and the battery switch 80 can be positioned in close proximity to each other in a wide variety of locations (e.g., not only at the helm, but at the positions convenient for connecting to external power). This helps inform people that in certain causes action will be needed for both the external power connection 74 and the battery switch 80, avoiding confusion and mistake-proofing the act of disconnecting power within the marine vessel 1. By way of non-limiting example, the following would constitute the external power connection 74 and the battery switch 80 being in close proximity to each other, though these do not necessarily form the upper bounds of the term: the external power connection 74 and the battery switch 80 being part of an assembly so as to be coupled to the marine vessel together (e.g., being accessible via a shared panel each is coupled to), each being coupled to the helm or elsewhere in the marine vessel, the external power connection 74 and the battery switch 80 being close enough to easily view their statuses and/or being within reach at the same time (e.g., 2 meters apart, or 1.5 meters, 1 meter, 0.5 meters, 0.25 meters, 0.10 meters, etc.)

Figure 2:
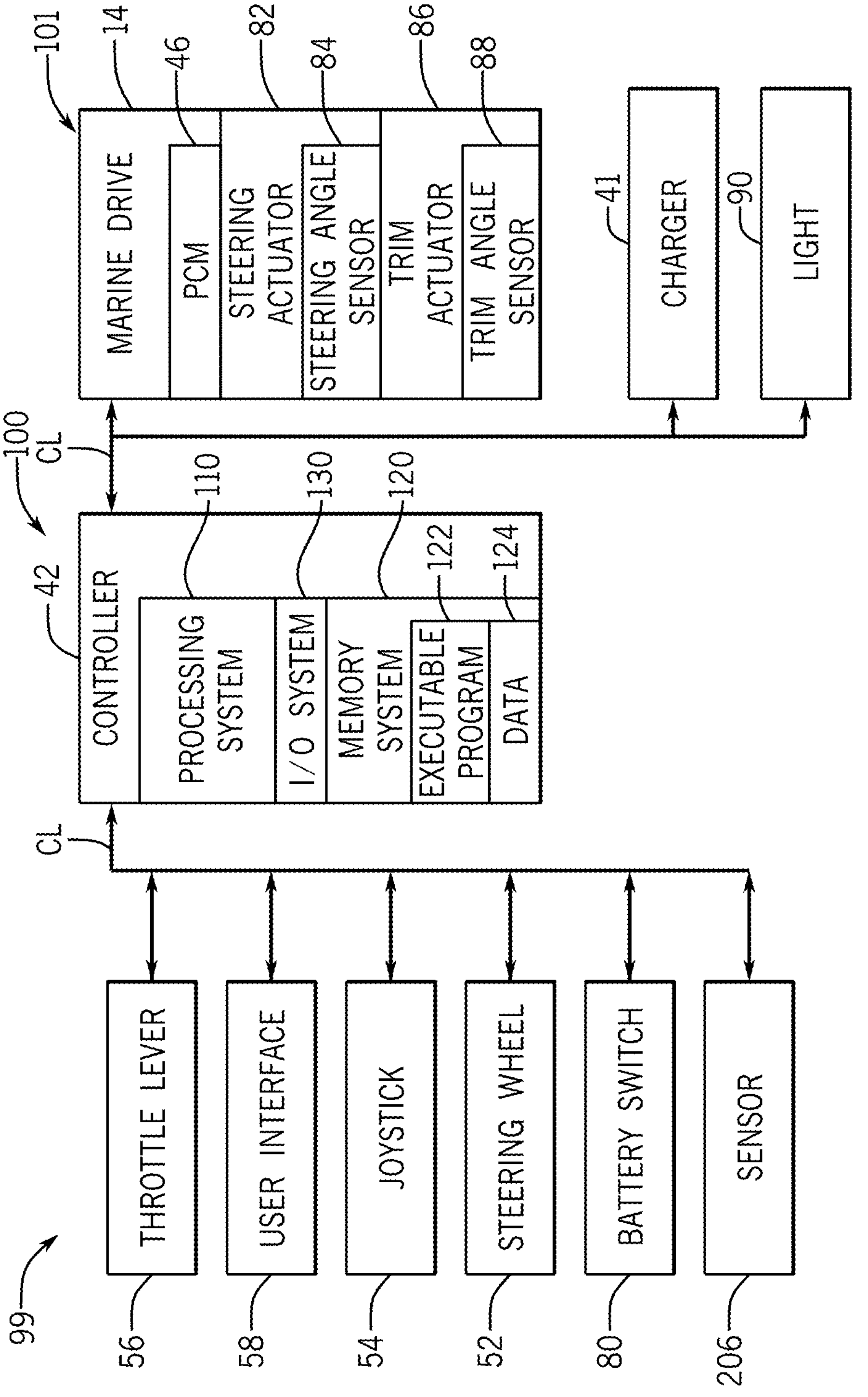
FIG. 2 is a schematic view of an example of a control system according to the present disclosure.

With reference to FIG. 2, additional information is now provided for an example of the control system 100 such as may be incorporated within the marine vessel 1 of FIG. 1. Certain examples of the present disclosure are described or depicted as functional and/or logical block components or processing steps, which may be performed by any number of hardware, software, and/or firmware components configured to perform the specified functions. For example, certain embodiments employ integrated circuit components, such as memory elements, digital signal processing elements, logic elements, look-up tables, or the like, configured to carry out a variety of functions under the control of one or more processors or other control devices. The connections between functional and logical block components are merely exemplary, which may be direct or indirect, and may follow alternate pathways.

In certain examples, the control system 100 communicates with each of the one or more components of the marine propulsion system 10 via a communication link CL, which can be any wired or wireless link. The control system 100 is capable of receiving information and/or controlling one or more operational characteristics of the marine propulsion system 10 and its various sub-systems by sending and receiving control signals via the communication links CL. In one example, the communication link CL is a controller area network (CAN) bus; however, other types of links could be used. It will be recognized that the extent of connections and the communication links CL may in fact be one or more shared connections, or links, among some or all of the components in the system 10. Moreover, the communication link CL lines are meant only to demonstrate that the various control elements are capable of communicating with one another, and do not represent actual wiring connections between the various elements, nor do they represent the only paths of communication between the elements. Additionally, the marine propulsion system 10 may incorporate various types of communication devices and systems, and thus the illustrated communication links CL may in fact represent various different types of wireless and/or wired data communication systems.

The control system 100 may be a computing system that includes a processing system 110, memory system 120, and input/output (I/O) system 130 for communicating with other devices, such as input devices 99 and output devices 101. The processing system 110 loads and executes an executable program 122 from the memory system 120, accesses data 124 stored within the memory system 120, and directs the power system 10 and the marine vessel 1 generally to operate as described in further detail below.

The processing system 110 may be implemented as a single microprocessor or other circuitry or be distributed across multiple processing devices or sub-systems that cooperate to execute the executable program 122 from the memory system 120. Non-limiting examples of the processing system include general purpose central processing units, application specific processors, and logic devices.

The memory system 120 may comprise any storage media readable by the processing system 110 and capable of storing the executable program 122 and/or data 124. The memory system 120 may be implemented as a single storage device or be distributed across multiple storage devices or sub-systems that cooperate to store computer readable instructions, data structures, program modules, or other data. The memory system 120 may include volatile and/or non-volatile systems and may include removable and/or non-removable media implemented in any method or technology for storage of information. The storage media may include non-transitory and/or transitory storage media, including random access memory, read only memory, magnetic discs, optical discs, flash memory, virtual memory, and non-virtual memory, magnetic storage devices, or any other medium which can be used to store information and be accessed by an instruction execution system, for example. By way of example, the computations described herein for preventing or minimizing cavitation oscillation may take place in a PCM and/or a motor controller.

FIG. 2 also shows other components that may be controlled by the control system 100, such as a steering actuator 82 and associated steering angle sensor 84, and a trim actuator 86 and trim angle sensor 88, each of which may be conventional and is thus not described further herein. The control system 100 may also control the operation of a light 90A or other notification devices (e.g., display screens, speakers, buzzers, vibration devices), which may be in addition to or as an alternative to similar notification functionalities of an external device 70 (FIG. 1) or display device 58.

Figure 3A:
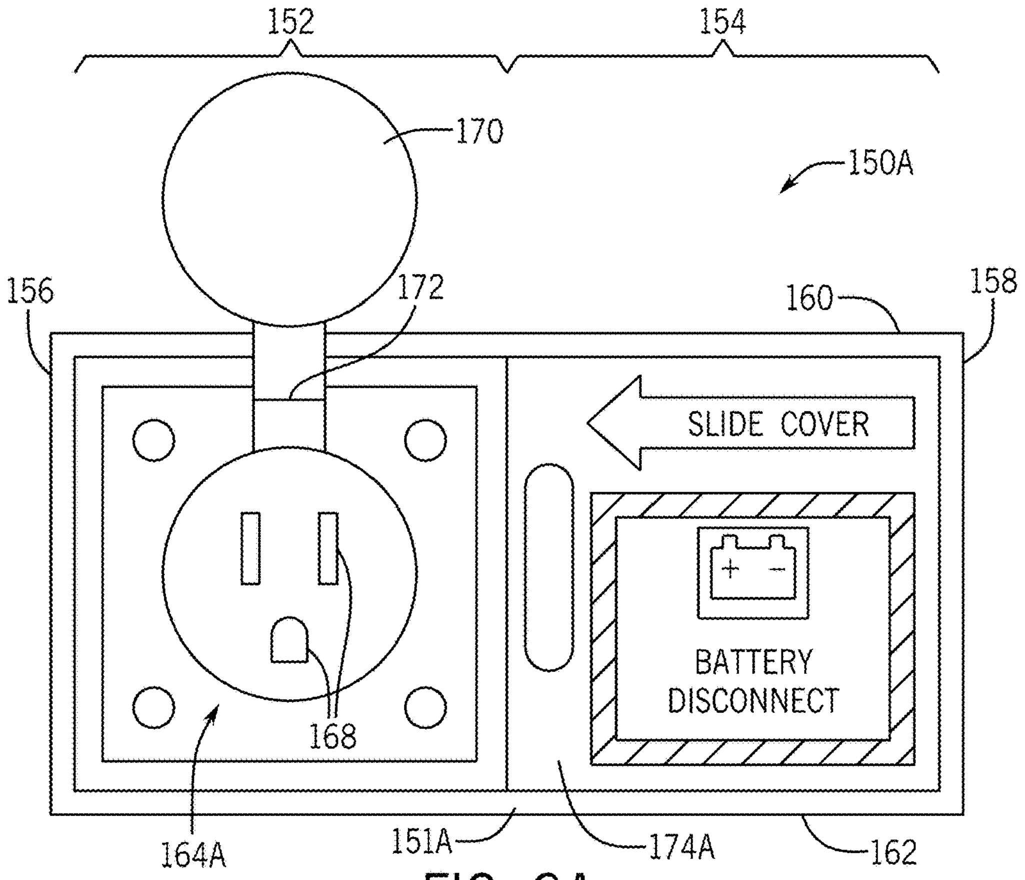
FIG. 3A is a front view of a panel for one embodiment of a power system according to the present disclosure, whereby a cover is shown in one position to expose an external power connection with a flap open.
Figure 3B:
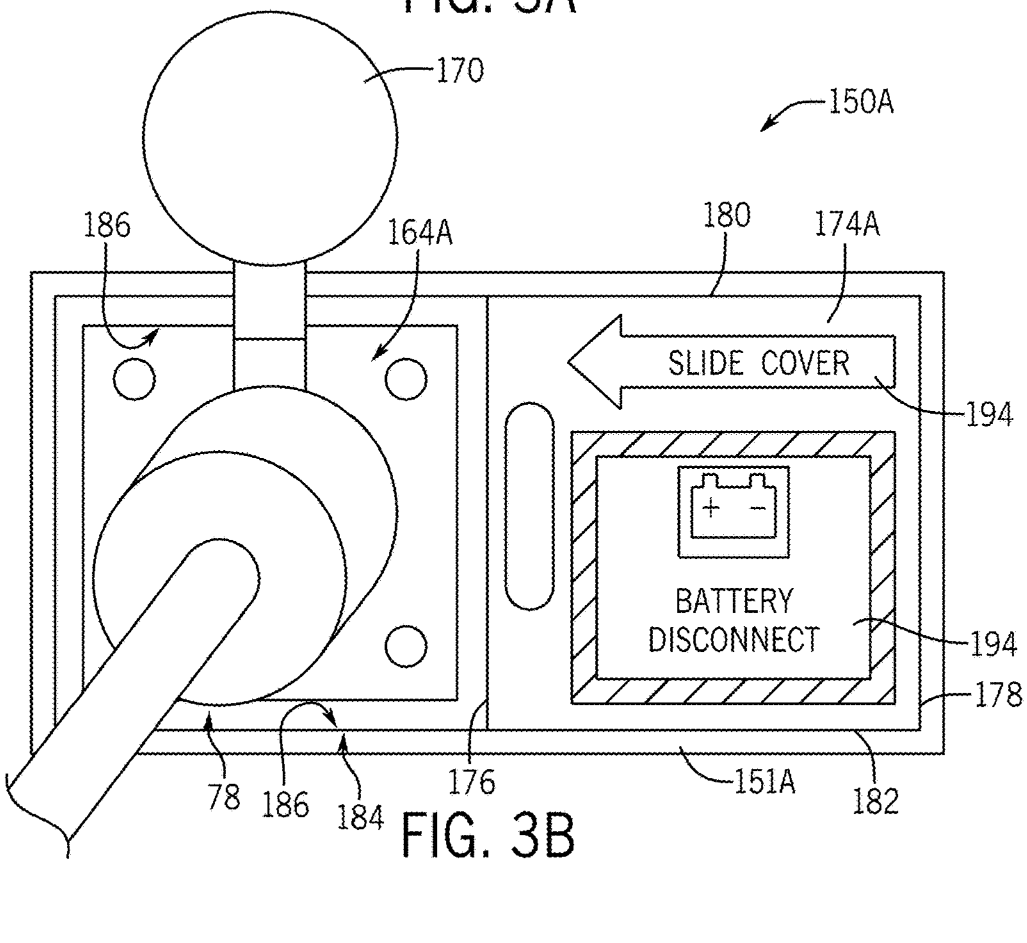
FIG. 3B is a front view of the panel from FIG. 3A with a cable plugged into the external power connection.
Figure 3C:
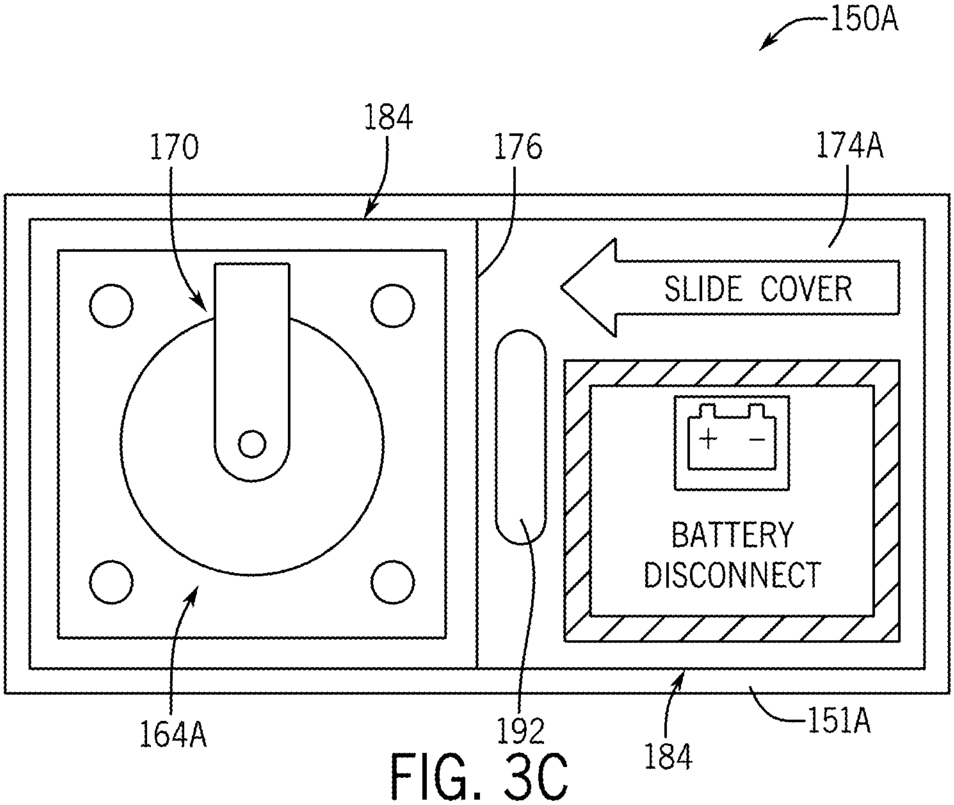
FIG. 3C is a front view of the panel from FIG. 3A with the flap closed.

FIGS. 3A-3C show a first embodiment of a panel assembly 150A within a power system 10 according to the present disclosure. The panel assembly 150A is configured to be coupled to the marine vessel at a position that is accessible and convenient to the users, in certain examples being positioned at or near the helm 51 (FIG. 1) or elsewhere in the marine vessel. The panel assembly 150A extends horizontally (as drawn) from a first end 156 to a second end 158, and vertically from a third end 160 to a fourth end 162. It should be recognized that the panel assembly 150A may be coupled to the marine vessel in any orientation and is not limited to that shown.

The panel assembly 150A includes a first section 152 and an adjacent second section 154. The first section 152 of the panel assembly 150A includes an external power connection 164A and the second section 154 includes a battery switch 166A (hidden in FIGS. 3A-3C, see FIGS. 4A-4B), which are types of external power connections 74 and battery switches 80 as discussed above with respect to FIG. 1. The external power connection 164A and the battery switch 166A are each coupled to a panel 151A or housing, through which the panel assembly 150A may be positioned and coupled to the marine vessel 1 (e.g., via fasteners or other mechanisms known in the art). The panel 151A may also be part of the marine vessel's hull or other structures thereof, such as a helm dashboard or the wall of a pedestal forming the hull.

In the embodiment of FIGS. 3A-3C, the external power connection 164A has a series of contacts 168, which may be recessed below the panel 151A, may be male or female, and may be of a conventional type known in the art. The contacts 168 and the configuration of the external power connection 164A generally are designed to mate with a like connector on a cable 78 connecting to an external power source such as the shore power station 76 of FIG. 1 (see FIG. 3B). The first section 152 also includes a flap 170 (also referred to as a cover) that is moveable between an open position in which the contacts 168 are accessible (FIG. 3A), and a closed position in which the contacts 168 are covered for weatherproofing, safety, and the like (FIG. 3C). The flap 170 may be pivotable about an axle 172 in a conventional manner, in certain examples being spring loaded or otherwise configured to automatically close when a cable 78 is not coupled to the external power connection 164A. The flap 170 may be formed of metal, plastic, rubber, or other conventional materials. The flap 170 may be configured such that it cannot be an open position when the battery switch is in the off position, as discussed further below.

The panel assembly 150A also includes a cover 174A that extends horizontally from a first end 176 to a second end 178 and vertically from a third end 180 to a fourth end 182. In general, the cover 174A is moveable between a first position (see FIGS. 4A-4B) to at least partially cover the first section 152 and thus prevents connecting to the external power connection 164A, and a second position (see FIGS. 3A-3C) in which the external power connection 164A is accessible for connecting thereto. It should be recognized that in the present embodiment access to the battery switch 166A is generally the opposite of access to the external power connection 164A, being at least partially covered when the cover 174A is in the second position and accessible when in the first position.

In the example of FIGS. 3A-4B, the cover 174A is horizontally slidable within a window 184 formed win the panel 151A, the window 184 having edges that are substantially parallel to those of the panel 151A. The cover 174A has a height between the third end 180 and the fourth end 182 thereof that is slightly larger than a height of the window 184 also in the vertical direction (as shown). Slots 186 extend horizontally in a recessed manner along the upper edge 188 and lower edge 190 of the window 184. The slots 186 are configured such that the cover 174A is retained therein and can only move in the horizontal direction. A handle or grip 192 is provided on or recessed into the cover 174A for ease of grabbing the cover 174A for sliding horizontally relative to the panel 151A. In certain examples, the cover 174A has a width in the horizontal direction that is approximately 50% of the width of the window 184 also in the horizontal direction. However, other dimensions are contemplated. Indicia 194 is provided to inform people that the battery switch is obscured by the cover 174A when in the second position, and that the cover 174A can be slid for access.

Figure 4A:
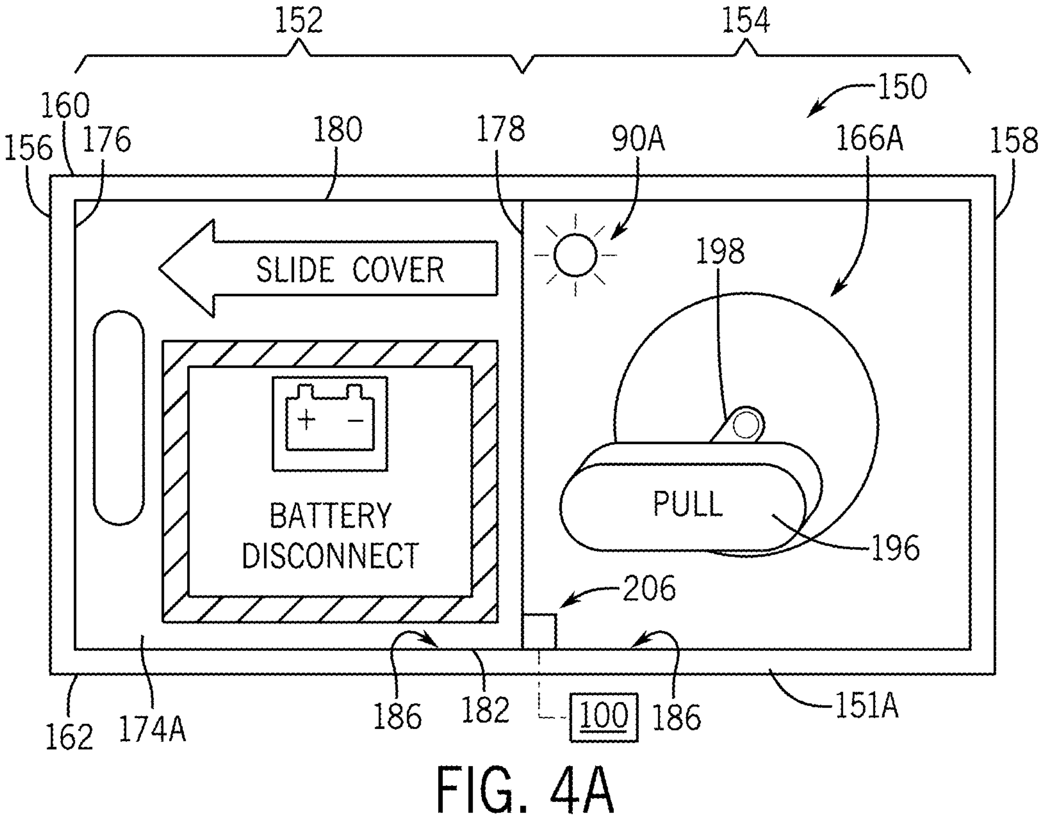
FIG. 4A is a front view of the panel from FIG. 3A with the cover in another position to cover the external power connection and expose a battery switch according to the present disclosure, the battery switch being switched in an on-state.
Figure 4B:
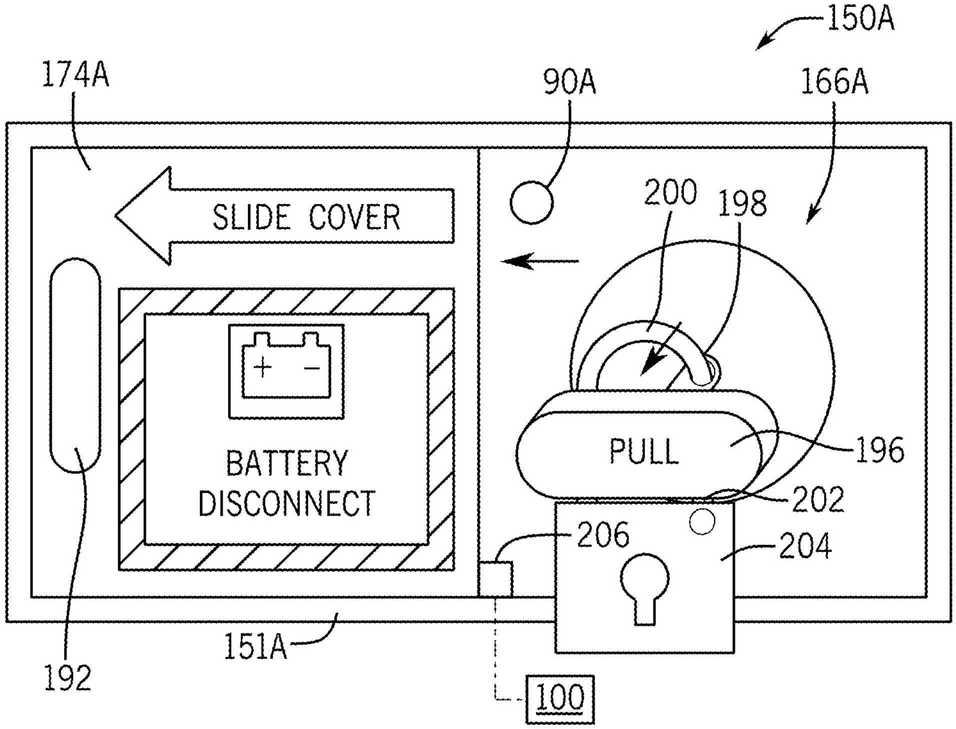
FIG. 4B is a front view of the panel as shown in FIG. 4A with the battery switch being switched in an off-state and locked.

As can be seen in FIGS. 3A-3C, when the cover 174A is in the second position, the flap 170 may be opened such that an external power source may be plugged into the external power connection 164A, or closed when the external power connection 164A is not plugged into. FIGS. 4A-4B show the first position of the cover 174A, whereby the external power connection 164A is at least partially blocked by the cover 174A. With the cover 174A in the first position, access is now provided to the battery switch 166A. As discussed above, the battery switch 166A is switchable between an on-state (FIG. 4A) in which the one or more batteries (or the power storage system generally) can provide energy to the marine vessel, and off-state (FIG. 4B) that prevents the battery from providing the energy to the marine vessel.

In certain embodiments, the battery switch 166A may be positioned in either the on state or the off state with the cover 174A in either the first position or the second position. In other embodiments, such as that shown, the panel assembly 150A is configured such that the cover 174A can only be moved to the second position (i.e., to plug in the external power source) when the battery switch is in the on-state. Specifically, the battery switch 166A of FIGS. 4A-4B is of the type in which a handle 196 is pulled axially outwardly, away from the panel 151A to which the battery switch 166A is mounted, to move from the on-state to the off-state. As with the external power connector 164A, the handle 196 may be recessed within the panel 151A so as to fit behind the cover 174A.

In further embodiments, an axle 198 of the handle 196 has an opening 200 therethrough, whereby the opening 200 is visible when the battery switch 166A is in the off-state and at least partially obscured within the battery switch 166A when in the on-state. As shown in FIG. 4B, the opening 200 is configured to receive a shackle 202 of the lock 204 therethrough to thereby lock the battery switch 166A in the off-state. This may be particularly advantageous when servicing the marine vessel to ensure that power is restored without the knowledge of the party that initially disabled the batteries via the battery switch 166A. By way of example, the lock 204 may be a keyed or combination padlock, a single-use plastic lock, or others known in the art.

Other configurations of panel assemblies 150 are also contemplated in which the battery switch 166A may be locked in the off-state by a lock separatable from the battery switch 166A. Additionally, other configurations of locks and mechanisms for preventing the battery switch 166A from moving are also contemplated. By way of example, the handle 196 may be configured such that locking the shackle 202 around the axle 198, rather than through the axle 198, also prevents the handle 196 from being moved inwardly until unlocked and removed.

The panel assembly 150A of FIGS. 4A-4B further includes a light 90A that indicates whether the battery switch 166A is in the off-state or the on-state, and thus whether the battery is operable to provide the energy to the marine vessel. In the embodiment shown, the light 90A is an LED that is powered by the batteries when the battery switch 166A is in the on-state, and that turns off when the battery switch 166A is in the off-state. This advantageously provides feedback to the user that the batteries have been successfully disconnected. In certain examples, the light 90A is positioned adjacent to the battery switch 166A and configured so as to be covered by the cover 174A when the cover 174A is in the first position. In other examples, the light 90A is positioned to be viewable in any position of the cover 174A.

The present inventors have recognized that the panel assembly 150A provides particular advantages over power systems presently known in the art. First, the user cannot operate the battery switch 166A when a cable is plugged into the external power connection 164A. In particular, the cover 174A must be slid to the first position to access the battery switch 166A, which cannot be done unless the external power connection 164A is unplugged. As such, the panel assembly 150A ensures that the external power connection 164A must be disconnected when the user decides to switch off the battery switch 166A, preventing the user from forgetting about this additional source of power.

It should be recognized that this benefit can arise from any type of battery switch, including those that are not pulled outwardly to switch to the off-state. However, the present inventors have identified further advantages to configurations in which the battery switch 166A is pulled outwardly or otherwise configured such that being in the off-state interferes with movement of the cover. In the embodiment of FIGS. 4A-4B, the cover cannot be slid to the second position to access the external power connection 164A while the handle 196 of the battery switch 166A is pulled out to the off-state. This physical interference provides that the batteries cannot accidentally be left in the off state when the user decides to plug in the external power connection 164A to charge the batteries. Since the cover 174A physically prevents this action, the handle 196 must be pressed into the panel 151A to turn the batteries back on before the cover 174 can be slid to have access for plugging in the cable 78 from the external power source. This configuration may be particularly advantageous with the use of chargers that do not communicate with the batteries and thus would continue to provide power to the power system if the external power connection 164A remained plugged in.

Other configurations of moveable covers for selectively accessing the external power connection and the battery switch are also contemplated by the present disclosure. By way of example, and with reference to the cover 174A of FIG. 3A, alternative covers may be pivotable (within the page as shown) about the upper left corner between the first end 156 and the third end 160 of the cover.

In another example, described with reference to FIG. 4A, alternative covers may be pivotable (out of the page as shown) about the edge at the second end 158 of the cover. In this case, a sensor 206 such as a momentary switch, Hall-effect sensor, optical sensors, or others known in the art may be positioned within the second section 154 to determine the position of the cover. The sensor 206 is configured to detect whether the cover is in the first position (FIG. 3A) or the second position (FIG. 4A) and is electrically coupled to provide this information to the control system 100.

The control system 100 may be further configured to automatically disable the charger 41 (FIG. 2) and/or other devices receiving power from the external power connection whenever the cover is not fully closed in the second position against the panel 151A, which is the case when the battery switch 166A is in the outward, off-state preventing this complete closure. In this manner, the power system is configured to automatically ensure that all power is disabled even if the external power connection is accidentally left plugged in.

Figure 6:
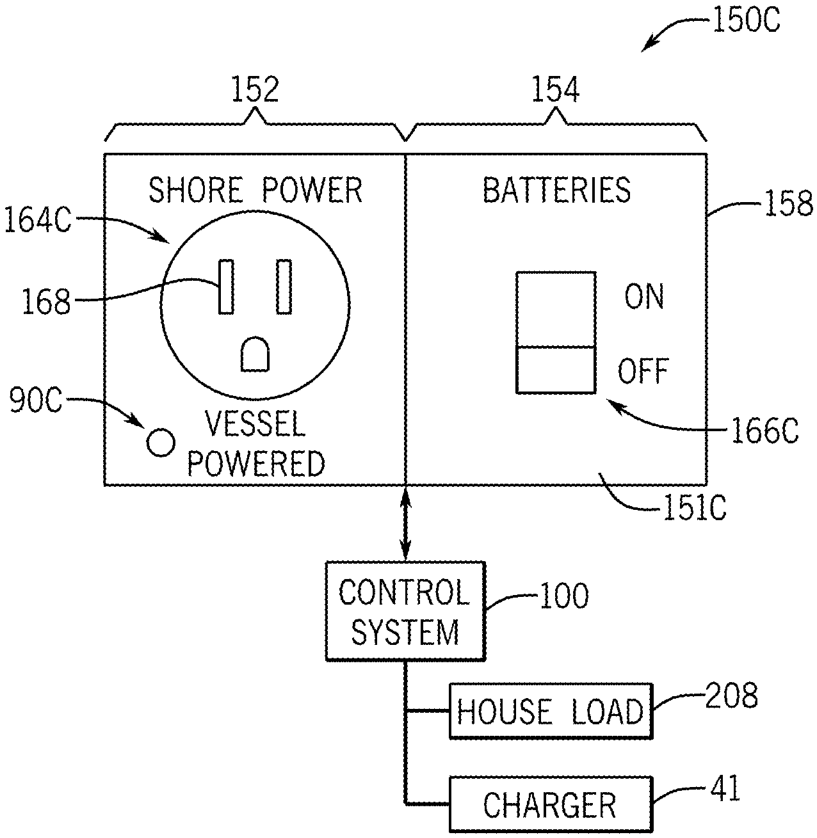
FIG. 6 is a front view of another panel for another embodiment of a power system according to the present disclosure.

Another configuration in which the control system 100 automatically disables the charger 41 (FIG. 2) and/or other devices receiving power from the external power connection based on the state of the battery switch is shown in FIG. 6. Notably, the panel 150C of FIG. 6 does not include a cover, though one could be used. Instead of physically blocking whether the external power connection 164C can be plugged in when the battery switch 166C is in the off-state, the control system 100 controls whether power is provided from the external power connection to the charger 90 or house load 208 based on the state of the battery switch 166C. When the battery switch 166C is in the off-state, the control system 100 is configured to disable the charger 90 and/or house load 208 to thereby prevent the battery from charging and/or to prevent power being provided to the house load 208. As stated above, the house load 208 may include wall outlets, appliances, and the like. In contrast, when the battery switch 166C is in the on-state, the control system 100 permits the batteries to be charged (and powering to the house load 208) when power is provided via the external power connection 164C. Another advantage of this configuration is that the battery switch 166C need not be designed to interfere with any moving covers of the like, providing additional design options.

To assist users in determining the status of the power system, and conveniently from a single panel 151C, a light 90C or other notification device is provided. In certain embodiments, the light 90C is caused to illuminate whenever the battery switch 166C is in the on-position or power is being provided from the external power connection 164C to the marine vessel (e.g., a charger and/or house load 208). In another embodiment, the light 90C is also or alternatively caused to illuminate whenever high voltage is detected to be present in the power storage system 40, regardless of the switch or the charger state. This can accommodate for different possible fail conditions, such as a battery malfunctioning whereby its internal on/off switch fails closed (despite the battery switch being turned off). The voltage may be determined using voltage sensors that already measure voltage within the power storage system. In this manner, the users are provided with visual confirmation when the complete task of disabling power to the marine vessel has been accomplished. It should be recognized that the light 90° C. provides utility even in configurations in which the control system 100 does not automatically disable power from the external power connection 164C. The present disclosure also contemplates providing the light 90C in configurations having a cover or other physical mechanisms for preventing plugging in the external power connection when the battery switch is in the off-position.

In certain embodiments, the user may also or alternatively be notified of the state of the power system (e.g., power being provided by the external power connection and whether the batteries are on) via devices other than lights on the panel of the panel assembly. By way of example, and referring to FIG. 1, text messaging, lights, or audible messages may be provided at the helm 51 via the display device 58 and/or an external device 70 (e.g., a smart watch) wirelessly communicating with the marine vessel 1. For example, the user may receive a reminder to unplug shore power from the external power connection when the battery switch is moved to the off-state.

Figure 5:
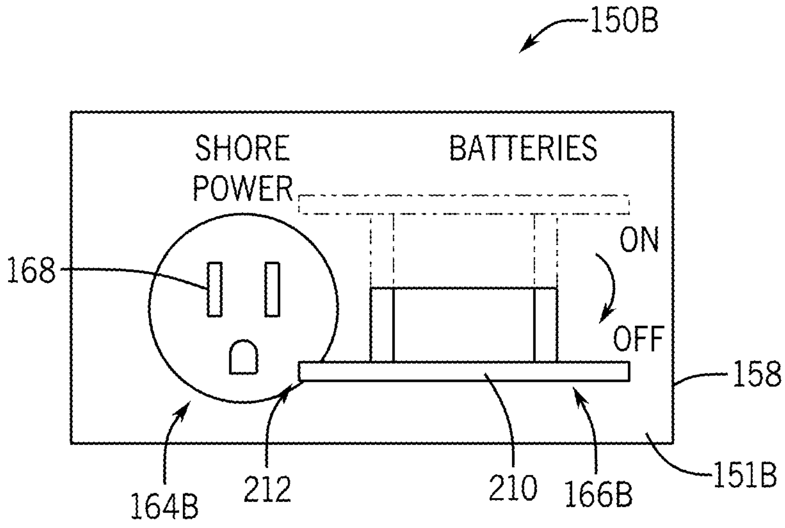
FIG. 5 is a front view of another panel for another embodiment of a power system according to the present disclosure.

Another embodiment of a panel assembly 150B according to the present disclosure is provided in FIG. 5. Like the embodiment of FIG. 6, no cover is shown. However, similar to the embodiment of FIGS. 3A-4B, the panel assembly 150B is configured such that the battery switch 166B be in the off-state (FIG. 5) physically prevents cables from being plugged into the external power connection 164B. In this case, a handle 210 of the battery switch 166B is configured such that one end 212 of the handle 210 partially covers the external power connection 164B when positioned in the off-state, but to not cover the external power connection 164B when in the on-state. This prevents cables from being plugged into the external power connection 164B when the battery switch 166B is in the off-state. Other types of switches are also contemplated, such as rotating switches having handles that partially block the external power connection 164B (e.g., similar to the battery switch 166A of FIG. 3A, whereby the handle 196 being horizontal corresponds to the off-state and being vertical corresponds to the on-state). Lights may also be provided to offer further notice to the user. However, the present inventors have recognized that the embodiments that provide physical blocking of the external power connection advantageously provide a simple, low-cost solution.

The present disclosure contemplates other configurations and types of battery switches that may physically block or prevent the cables from being plugged into the external power connection when in the off-state. For example, the battery switch may be a partial circular disc that rotates between on and off-states. In the off-state, the disc may at least partially cover the external power connection. In contrast, in the on-state, a portion of the disc that is missing or otherwise open is aligned with the external power connection to allow the cable to be plugged therein (e.g., the disc may be a circular arc of 270 degrees, providing a 90 degree open space).

Figure 7:
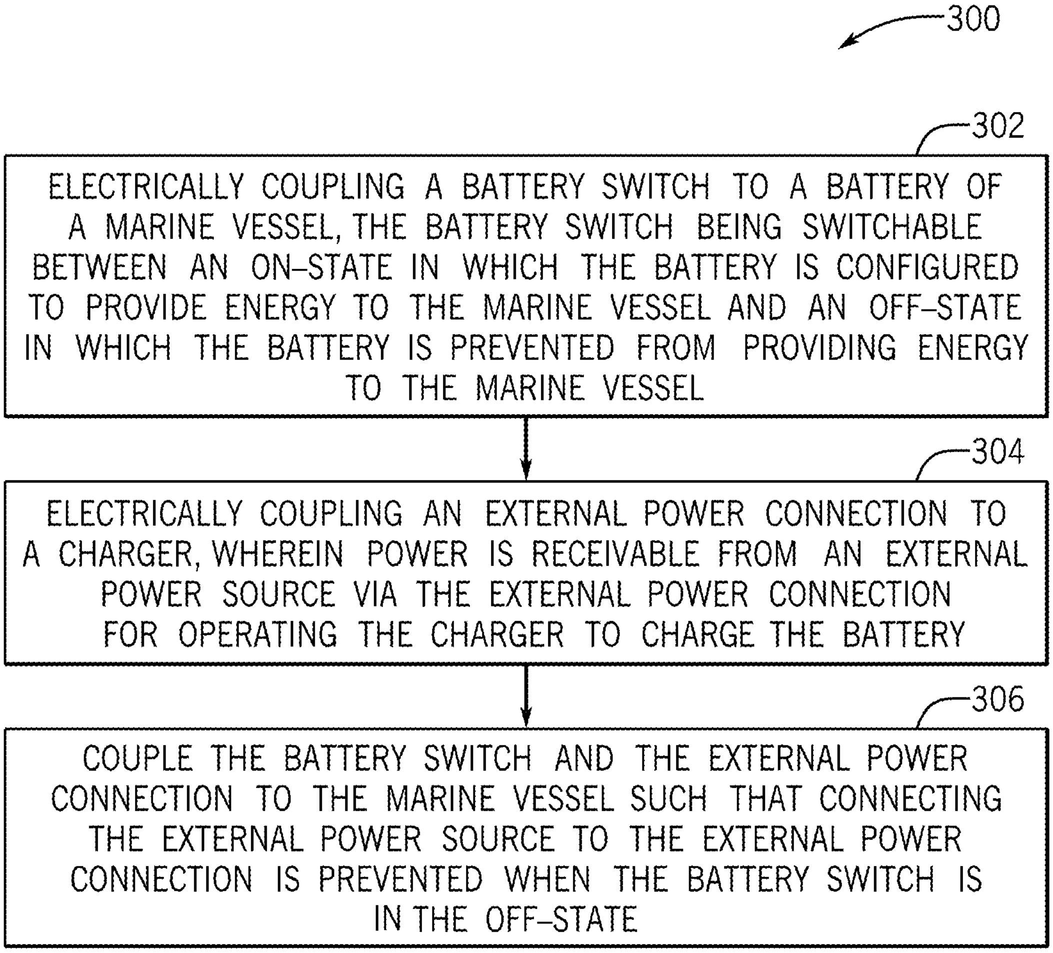
FIG. 7 is a flow chart showing a method for configuring a marine vessel for controlling power therein according to the present disclosure.

FIG. 7 is a flow chart for a method 300 for configuring a marine vessel for controlling power therein, whereby the marine vessel has a battery or other mechanism for storing energy, as well as a charger that receives power from an external power source for charging them, which may be structured similarly to that shown in FIG. 1. Step 302 provides for electrically coupling a battery switch to the battery, where the battery switch is switchable between an on-state in which the battery is configured to provide the energy to the marine vessel and an off-state in which the battery is prevented from providing the energy to the marine vessel. The battery switch may be of a type that is commercially available, but in certain examples is not of a type known for use in marine vessels. For example, the battery switch 166B of FIG. 5 may traditionally be considered too bulky for application in a marine vessel, but in view of the present disclosure now provides advantage for the purposes of blocking connections to the external power connection.

Step 304 provides for electrically coupling an external power connection through which power is receivable from an external power source for operating the charger to charge the battery. The electrical connections may be made in a conventional manner. However, in certain examples the electrical connections may vary from techniques known in the art where a control system automatically disables incoming power from the external power connection (e.g., FIG. 6). Step 306 provides for coupling the battery switch and the external power connection to the marine vessel such that connecting to the external power connection is prevented when the battery switch is in the off-state. As discussed above, this coupling of the battery switch and the external power connection may be via a common panel to which each is first coupled. In certain examples, the battery switch and external power connection may be positioned in close enough proximity to enable the physical blocking of the external power connection when the battery switch if off, either blocked by the battery switch or blocked by another element such as a cover. In other examples, the battery switch and external power connection are electrically connected in a manner that a control system automatically disables the external power connection when the battery switch is off, which does not necessitate the battery switch and external power connection being in especially close proximity. However, as discussed above, the present inventors has identified that there are still advantages in the battery switch and external power connection being sufficiently close or adjacent to each other such that each is viewable or accessible and operable at the same time.

Figure 8A:
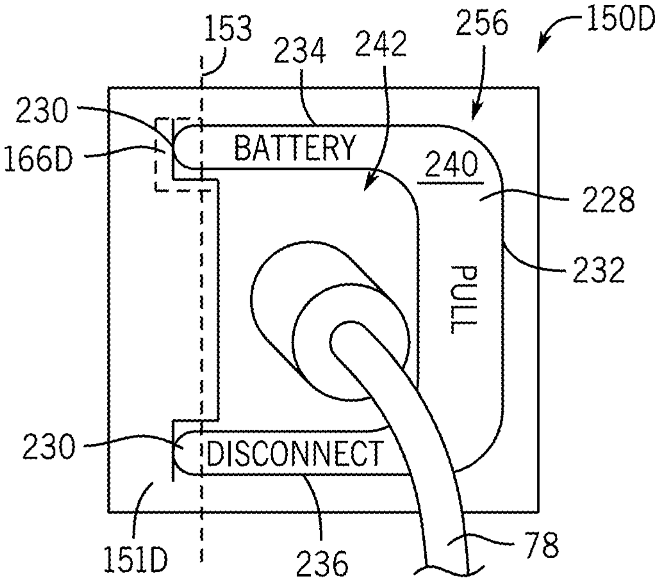
FIG. 8A is a front view of another panel for another embodiment of a power system according to the present disclosure, shown in an on-state.
Figure 8B:
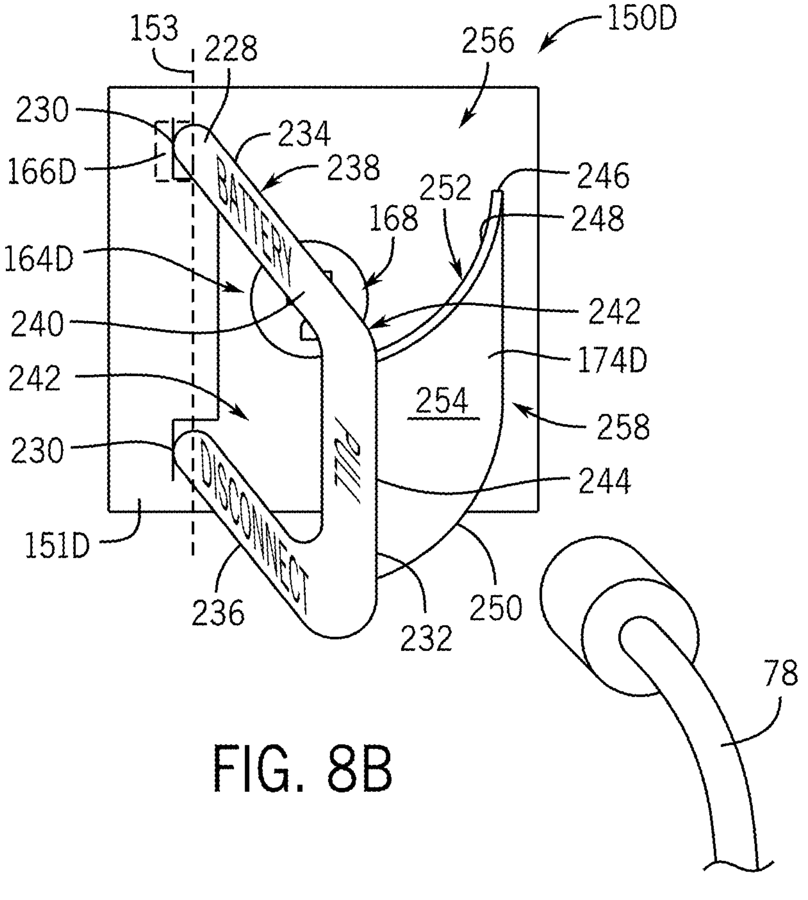
FIG. 8B is a front view of the panel from FIG. 8A, now shown in an off-state.

Another embodiment of a panel assembly 150D according to the present disclosure is provided in FIGS. 8A-8B. For brevity, similar reference numbers are provided for components that could be similar to those already described above. For example, the panel assembly 150D includes a panel 151D that supports an external power connection 164D in the same or a similar manner as other embodiments discussed above.

The panel assembly 150D has a u-shaped handle 228 that extends between a first end 230 and a second end 232, a third end 234 and a fourth end 236, and between an inside 238 and an outside 240. The handle 228 is pivotally coupled to the panel 151D at or near the first end 230 of the handle 228, here pivoting about an axis 153. By way of example, the pivot coupling may be via an axle, molded extensions at or near the first end 230 of the handle 228 that are received in corresponding recesses in the panel 151D, vice versa, or other mechanisms known in the art.

The handle 228 is pivotable between a first position shown in FIG. 8A and a second position shown in FIG. 8B. When the handle 228 is in the first position, the outside 240 faces substantially outwardly, away from the panel 151D. The handle 228 defines a space 242 through which the cable 78 may extend to mate with the external power connection 164D when the handle 228 is in the first position.

A battery switch 166D is supported by the panel 151D and movable between an on-state and an off-state. The battery switch 166D to be moved via pivoting of the handle 228. By way of example, the battery switch 166D may be a conventional momentary switch, proximity switch, or a pair of electrical contacts that are closed by the handle 228 when the handle 228 is in the first position (e.g., the inside 238 of the handle 228 contacts, applies a force to, or otherwise actuates the battery switch 166D). In this manner, the battery switch 166D is positioned to be in the on-state when the handle 228 is in the first position (FIG. 8A). Likewise, moving the handle 228 to the first position automatically results in the battery switch 166D being moved into the off-state. Therefore, the operator may selectively connect and disconnected the power provided via the battery system by moving the handle 228 relative to the panel 151D.

The panel assembly 150D further includes a cover 174D that is coupled to the handle 228, here substantially near the second end 232 thereof. The cover 174D extends between a first end 244 and second end 246, between a third end 248 and a fourth end 250, and between an inside 252 and an outside 254. In the example shown, the cover 174D is rigid, being integrally formed with or coupled to the handle 228. However, other configurations are contemplated by the present disclosure, including the cover 174D being a resilient material, fabric, or other structures known in the art. In such a case, the second end 246 may be coupled to the panel 151D via adhesives, fasteners (e.g., rivets or screws), or other techniques. In configurations in which the cover 174D is rigid, an opening 258 is provided in the panel 151D that allows the cover 174D to move therein as the cover 174D is moved via movement of the handle 228. For brevity, the handle 228 and the cover 174D may together be referred to as the moveable portion 256 of the panel assembly 150D, in contrast to the stationary portion that includes the panel 151D and the external power connection 164D.

When the handle 228 is positioned in the first position (FIG. 8A), the cover 174D is configured to not prevent the cable 78 from mating with the external power connection 164. In contrast, when the handle 228 is positioned in the second position (FIG. 8B), it can be seen that the cover 174D prevents the cable 78 from mating with the external power connection 164. Additionally, the handle 228 cannot be moved from the second position to the first position while the cable 78 remains mated with the external power connection 164, whereby interference between the cable 78 and the handle 228 prevents the handle 228 from moving far enough to switch the battery switch 166D to the off-state. It should be recognized that the panel assembly 150D are sized and shaped such that the cable 78 is not sufficiently flexible to remain connected to the external power connection 164D when the handle 228 is in the second position.

In this manner, the panel assembly 150D of FIGS. 8A-8B require the operator to disconnect the incoming power from the cable 78 when disconnecting the battery, ensuring that no power can be provided to the system. Likewise, operators are prevented from connecting the cable 78 to the external power connection 164D while the battery switch remains in the off-state (i.e., the handle 228 remains in the second position). This prevents misinterpretations that the system is unpowered simply because the battery is disconnected.

Other features from other embodiments may also be incorporated within the panel assembly 150D, such as indicator lights and the like.

Figure 9B:
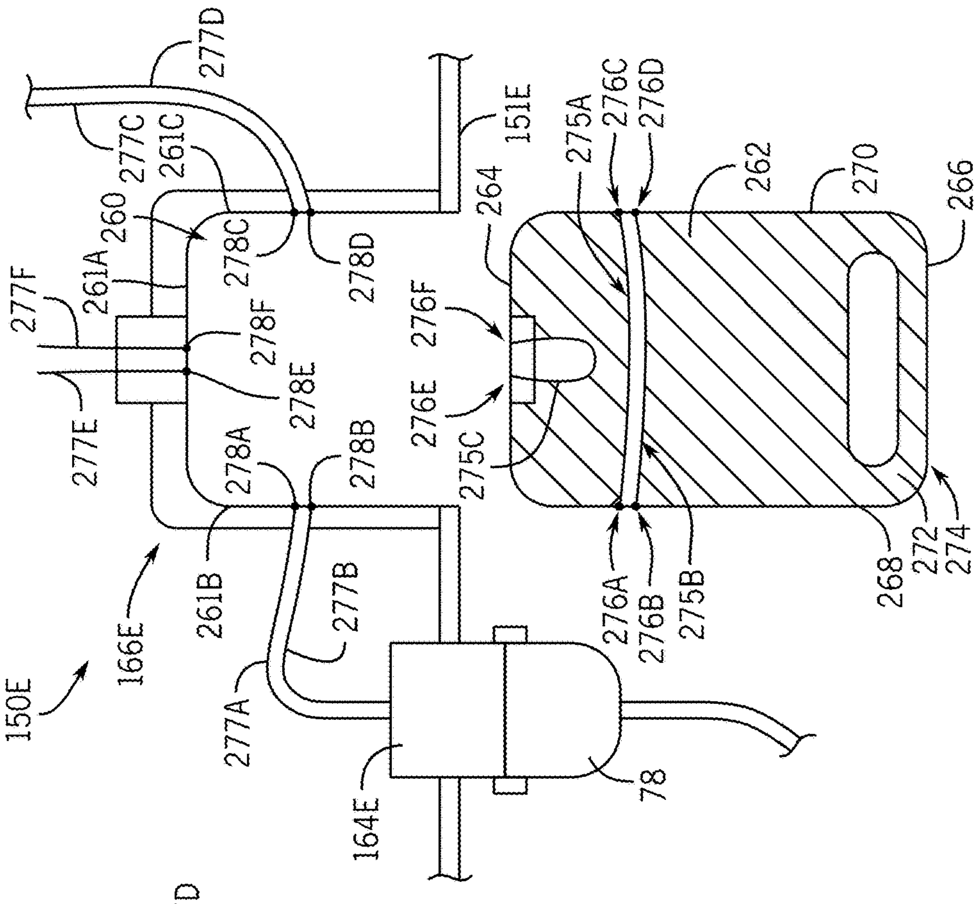
FIG. 9B is a sectional top view of the panel from FIG. 9A, now shown in an off-state.
Figure 9A:
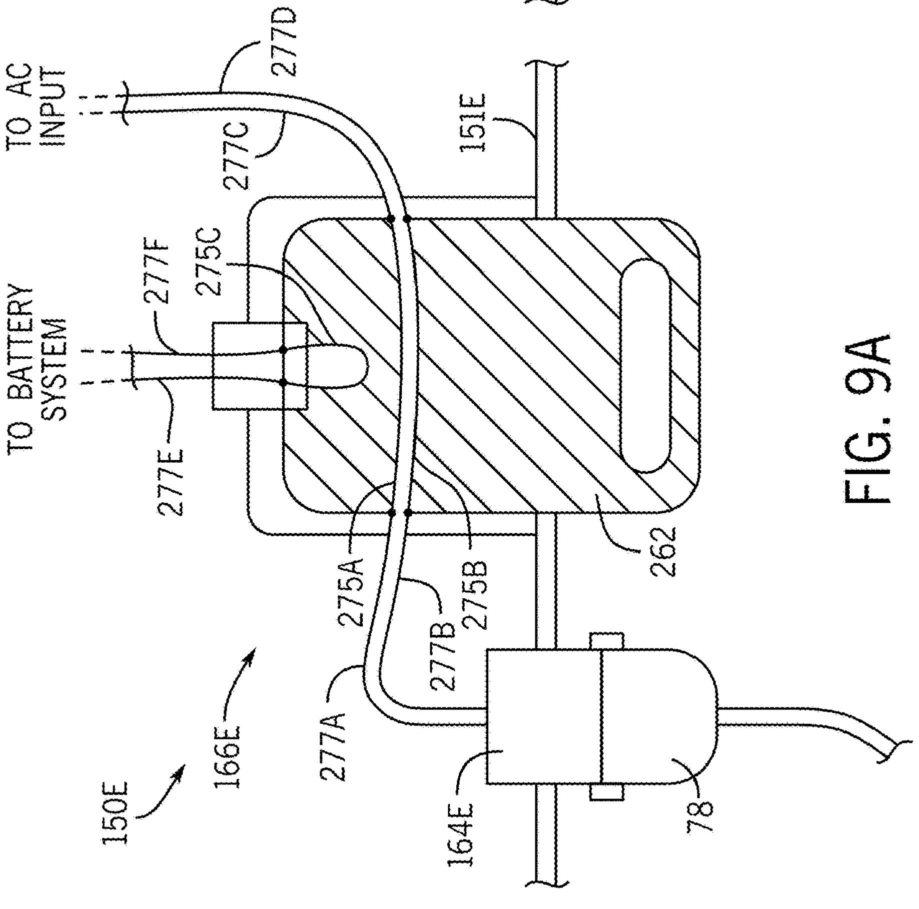
FIG. 9A is a top sectional view of another panel for another embodiment of a power system according to the present disclosure, shown in an on-state.

FIGS. 9A-9B depict a further embodiment of a panel assembly 150E according to the present disclosure. The panel assembly 150E includes a panel 151E, which in certain examples is part of the hull or a wall within the marine vessel. A recess 260 extends inwardly from the panel 151E, which is configured to receive a connection key 262 therein. The recess 260 is open at one end but at least has walls 261A, 261B, and 261C. The connection key 262 extends between a first end 264 and a second end 266, between a third end 268 and a fourth end 270, and between a fifth end 272 and a sixth end 274, here being a substantially rectangular prism like a key card. Electrical conductors 275A and 275B electrically connect electrical contracts 276A and 276B positioned on the third end 268 of the connection key 262 to additional electrical 276C and 276D and the fourth end 270 of the connection key 262, respectively. Another electrical conductor 275C electrically connects electrical contacts 276E and 276F both positioned on the first end 264 of the connection key 262. The electrical contacts 276A-F need not be opposingly, nor on the ends of the connection key as shown, provided that corresponding electrical contacts in the recess 260 are positioned accordingly, as will become apparent. By way of example, the electrical conductors and/or electrical contacts may comprise copper, aluminum, or other suitable conductors molded into a plastic connection key 262.

The recess 260 includes electrical contacts 278A-278F that correspond to the electrical contacts 276A-276F of the connection key 262. In other words, electrical contact 276A of the connection key 262 is electrically coupled to the electrical contact 278A of the recess 260 when the connection key 262 is inserted in the recess 260, and likewise for electrical contacts 276B-276F with electrical contacts 278B-278F. The electrical contacts 278A and 278B are electrically coupled via electrical conductors 277A and 277B to the external power connection 164E, which may be similar to other external power connections discussed above. Thus, the electrical contracts 278A and 278B have the same electrical potential as that provided by the cable 78 when the cable 78 is mated with the external power connection 164E.

The electrical contacts 278C and 278D are electrically coupled to provide incoming AC power to components within the marine vessel, specifically via electrical conductors 277C and 277D. Thus, when the connection key 262 is positioned within the recess 260, AC power flows to the components within the marine vessel via the electrical conductors 277A-277D and 275A-275B.

The electrical contacts 278E and 278F are electrically coupled to battery system such that a shunt selectively coupling the electrical contacts 278E and 278F serves as the battery switch 166E for connecting and disconnecting the battery system. The connection key 262 includes this shunt or switch, specifically the electrical conductor 275C. In other words, when the connection key 262 is positioned in the recess 260, the electrical conductor 275C electrically couples the electrical connections 278E-278F (via contact with electrical contacts 276E-276F), which is considered to be the battery switch 166E being in the on-state (FIG. 9A). In contrast, removing the connection key 262 disconnects the electrical connections 278E-278F, thereby being considered to be the battery switch 166E in the off-state (FIG. 9B).

It should be recognized that for the panel assembly 150E of FIGS. 9A-9B, the battery connection and the incoming power connection are simultaneously connected and disconnected, specifically be inserting or withdrawing the connection key 262 from the recess 260. This advantageously avoids and errors or questions regarding whether all sources of power have been connected or disconnected, what sequence to connect or disconnect these power sources, and the like. In certain embodiments, the electrical connections are positioned and/or shaped (e.g., elongated) such that one source of power may be connected before the other.

It should also be recognized that other mechanisms are contemplated for the connection key 262 electrically coupling the electrical conductors 277A-277F, including different types of plugs, connectors, outlets, and the like known in the art.

In this manner, the presently discussed systems and methods provide for intuitive, simple, and automatic assistance in disabling power in a marine vessel. This may be particularly advantageous in the context of a user that is not familiar with the marine vessel, such as a first responder, a renter, or a new boat owner. However, the benefits are nonetheless applicable to experienced operators as well, preventing accidents and improving awareness of the status of the system.

The present inventors have also recognized that the system and methods disclosed herein also provide improvement for service in the field. For example, if the battery disconnect switch is used for service, the systems and methods described above make it much easier for a service technician to isolate the power sources, perform lock-out/tag-out, and confirm the high voltage circuit is deenergized. The easier this is accomplished, the more likely it is to be performed and performed correctly prior to servicing the system.

It should be recognized that the presently disclosure is not limited to systems and methods in which use of the external power connection precludes use of a battery switch, as there are still benefits to simply providing both on the same panel and/or in close proximity to each other. The present disclosure also contemplates other mechanisms for covers, including hinged or pivoting.

The functional block diagrams, operational sequences, and flow diagrams provided in the Figures are representative of exemplary architectures, environments, and methodologies for performing novel aspects of the disclosure. While, for purposes of simplicity of explanation, the methodologies included herein may be in the form of a functional diagram, operational sequence, or flow diagram, and may be described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology can alternatively be represented as a series of interrelated states or events, such as in a state diagram. Moreover, not all acts illustrated in a methodology may be required for a novel implementation.

This written description uses examples to disclose the invention, including the best mode, and also to enable any person skilled in the art to make and use the invention. Certain terms have been used for brevity, clarity, and understanding. No unnecessary limitations are to be inferred therefrom beyond the requirement of the prior art because such terms are used for descriptive purposes only and are intended to be broadly construed. The patentable scope of the invention is defined by the claims and may include other examples that occur to those skilled in the art. Such other examples are intended to be within the scope of the claims if they have features or structural elements that do not differ from the literal language of the claims, or if they include equivalent features or structural elements with insubstantial differences from the literal languages of the claims.

What is claimed is:

1. A power system for a marine vessel, the power system comprising:

a battery configured to store energy for the marine vessel;

a charger operable to charge the battery;

a battery switch operatively coupled to the battery, wherein the battery switch is switchable between an on-state in which the battery is configured to provide the energy to the marine vessel and an off-state in which the battery is prevented from providing the energy to the marine vessel; and an external power connection through which power is receivable for operating the charger to charge the battery, wherein the external power connection is physically positioned adjacent to the battery switch such that each is accessible by a single user at the same time.

2. The power system according to claim 1, wherein the battery switch and the external power connection are each coupled to a panel so as to be coupled to the marine vessel together.

3. The power system according to claim 1, further comprising a cover moveable between a first position that prevents connecting to the external power connection to provide power to the charger and a second position in which the external power connection is accessible for connecting thereto.

4. The power system according to claim 3, wherein the cover is slidable between the first position and the second position.

5. A power system for a marine vessel, the power system comprising:

a battery configured to store energy for the marine vessel;

a charger operable to charge the battery;

a battery switch operatively coupled to the battery, wherein the battery switch is switchable between an on-state in which the battery is configured to provide the energy to the marine vessel and an off-state in which the battery is prevented from providing the energy to the marine vessel; and an external power connection through which power is receivable for operating the charger to charge the battery, wherein the external power connection is positioned adjacent to the battery switch such that each is accessible at the same time, wherein when the cover is in the first position the battery switch is switchable to the off-state to prevent the battery from providing the energy to the marine vessel, and wherein when the cover is in the second position the battery switch is prevented from being switched to the off-state.

6. The power system according to claim 1, wherein the battery switch is configured such that the battery switch can be locked in the off-state by a lock separatable from the battery switch.

7. The power system according to claim 6, wherein the battery switch is coupled to the marine vessel via a housing, and wherein at least one of the battery switch and the housing is configured to receive a shackle of the lock to lock the battery switch in the off-state.

8. The power system according to claim 1, wherein the battery switch comprises a handle and is configured such that pulling the handle outwardly disconnects the battery from providing the energy to the marine vessel.

9. The power system according to claim 8, further comprising a cover moveable between a first position in which the handle may be pulled outwardly to disconnect the battery and a second position in which the handle is prevented from being pulled outwardly to disconnect the battery.

10. The power system according to claim 1, further comprising a light that indicates whether the battery is operable to provide the energy to the marine vessel.

11. The power system according to claim 10, wherein the light is positioned adjacent to the battery switch, wherein the light is on when the battery is operable to provide the energy to the marine vessel, and wherein the light turns off when the battery switch is operated to disconnect the battery from providing the battery to the marine vessel to thereby provide notification of the disconnecting.

12. The power system according to claim 1, further comprising a first cover moveable between a first position that prevents connecting to the external power connection to provide power to the charger and a second position in which the external power connection is accessible for connecting thereto, and further comprising a second cover separate from the first cover and moveable between a first position in which the external power connection is accessible and a second position in which the external power connection is blocked so as to shield the external power connection from weather.

13. The power system according to claim 12, wherein the first cover is configured such that when the first cover is in the first position the second cover is prevented from being in the first position.

14. The power system according to claim 1, wherein the battery switch being in the off-state causes the external power connection to be physically prevented from connecting to the power system via interference.

15. The power system according to claim 1, wherein the battery switch and the external power connection are configured such that when a connection is made to the external power connection the battery switch is physically prevented from being in the off-state.

16. The power system according to claim 1, further comprising a control system operatively coupled to the battery switch and the charger, wherein the control system is configured to determine that the battery switch is in the off-state and to disable the charger to thereby prevent the battery from charging when the battery switch is in the off-state.

17. The power system according to claim 1, further comprising a control system operatively coupled to the battery switch and the charger, wherein the control system is configured to determine that the battery switch is in the off-state and to prevent power from being received through the external power connection when the battery switch is in the off-state.

18. The power system according to claim 1, wherein the external power connection is configured to receive AC power from outside the marine vessel, and wherein the battery switch and the external power connection are parts of the marine vessel.

19. A method for configuring a marine vessel for controlling power therein, the marine vessel comprising a battery configured to store energy for the marine vessel, and the marine vessel further comprising a charger configured to receive power from an external power source for charging the battery, the method comprising:

electrically coupling a battery switch to the battery, wherein the battery switch is switchable between an on-state in which the battery is configured to provide the energy to the marine vessel and an off-state in which the battery is prevented from providing the energy to the marine vessel;

electrically coupling an external power connection through which power is receivable from an external power source for operating the charger to charge the battery; and coupling the battery switch and the external power connection to the marine vessel such that the battery switch being in the off-state causes the external power connection to be physically prevented from connecting.

20. A power system for a marine vessel, the power system comprising:

a battery configured to store energy for the marine vessel;

a charger operable to charge the battery;

a battery switch operatively coupled to the battery, wherein the battery switch is switchable between an on-state in which the battery is configured to provide the energy to the marine vessel and an off-state in which the battery is prevented from providing the energy to the marine vessel;

an external power connection through which power is receivable for operating the charger to charge the battery; and a cover moveable between a first position that prevents connecting to the external power connection and a second position in which the external power connection is accessible for connecting thereto, wherein the battery switch is switchable to the off-state only when the cover is in the first position.

* * * * *